United States Patent [19]
Kidode et al.

[11] 3,943,344
[45] Mar. 9, 1976

[54] APPARATUS FOR MEASURING THE ELEVATION OF A THREE-DIMENSIONAL FOREGROUND SUBJECT

[75] Inventors: Masatsugu Kidode; Haruo Asada, both of Yokohama, Japan

[73] Assignee: Tokyo Shibaura Electric Co., Ltd., Kawasaki, Japan

[22] Filed: June 26, 1974

[21] Appl. No.: 483,411

[30] Foreign Application Priority Data
June 30, 1973  Japan .................................. 48-74204

[52] U.S. Cl. ................ 235/151.32; 343/7.9; 33/1 A
[51] Int. Cl.² ......................... H04N 1/04; G06F 7/00
[58] Field of Search .................. 235/151.32; 33/1 A; 356/12, 14, 163; 343/7.9, 5 MM; 178/6.5; 354/112, 114

[56] References Cited
UNITED STATES PATENTS

| | | | |
|---|---|---|---|
| 3,191,170 | 6/1965 | Lustig et al. ...................... | 343/7.9 X |
| 3,375,353 | 3/1968 | Rossoff et al. ...................... | 235/151 |
| 3,465,444 | 9/1969 | Blachut et al. ..................... | 33/1 A X |
| 3,546,375 | 9/1965 | Vitt, Jr. ............................. | 343/7.9 X |
| 3,678,190 | 7/1972 | Cook .................................. | 178/6.5 |
| 3,725,563 | 4/1973 | Woycechowsky ................ | 343/7.9 X |
| 3,748,042 | 7/1973 | Diamantides ....................... | 356/163 |
| 3,748,644 | 7/1973 | Tisdale ............................... | 343/5 MM X |

Primary Examiner—Edward J. Wise
Attorney, Agent, or Firm—Oblon, Fisher, Spivak, McClelland & Maier

[57] ABSTRACT

An apparatus for measuring the elevation of a three-dimensional foreground subject which comprises the steps of determining the interrelationship of the first and second images of the three-dimensional foreground subject photographed at two different points to find minute mutually corresponding areas in two images; correcting the first photographed image according to the displacement of the corresponding areas from each other; again determining the interrelationship of the corrected first pseudo-image and the noncorrected second image; correcting the second image by said interrelationship to provide a corrected second pseudo-image; determining the interrelationship of said corrected second pseudo-image and the original second image; repeating the above-mentioned operation; when the determined displacements of the first and second images fall to below a certain value, calculating an algebraic sum of all the determined displacements of said first and second images; and finally measuring the elevation of a three-dimensional foreground subject from the calculated algebraic sum, a distance between the aforesaid two different points of photographing and the already measured height of said two points.

4 Claims, 10 Drawing Figures

APPARATUS FOR MEASURING THE ELEVATION OF A THREE-DIMENSIONAL FOREGROUND SUBJECT

BACKGROUND OF THE INVENTION

This invention relates to an apparatus for measuring the elevation of a three-dimensional foreground subject and more particularly to an apparatus for measuring the elevation of a three-dimensional foreground subject by reference to paired images of said foreground subject photographed from two points, of known height (said photographed images are generally referred to as "stereoscopic photographs").

The known means for preparing a contour map utilizes a plurality of aeronautic stereoscopic photographs. These stereoscopic photographs are derived from the photographing of substantially the same area from two points of known height spaced from each other at a prescribed distance. Namely, the prior art process comprises the steps of optically treating the stereoscopic photographs of a three-dimensional foreground subject determining the displacements of corresponding points included in a pair of said stereoscopic photographs and calculating the elevation of the foreground subject by said displacements and the known height of said different points of photographing and a distance therebetween. However, the process of determining the elevation of a foreground subject simply by optically treating the corresponding points on the images photographed at two points, namely determining said elevation from density data merely consisting of image elements, that is, data on the light and shade of the photographed images presents difficulties in accurately measuring said elevation. General practice, therefore, is to determine the interrelationship of the minute areas including the neighborhood of the above-mentioned elements indicated in the photographs, regard those areas whose interrelationship gives a maximum value as mutually corresponding ones and calculate the displacement of said minute areas from each other as that of the corresponding points.

However, the above-mentioned customary practice fails to carry out the accurate measurement of the elevation of a three-dimensional foreground subject, because, as any selected points in the minute areas in the stereoscopic photographs of said foreground subject denote the different elevation of said foreground subject, distortion takes place in said stereoscopic photographs.

SUMMARY OF THE INVENTION

It is accordingly the object of this invention to provide an apparatus capable of measuring the elevation of a three-dimensional foreground subject from stereoscopic photographs thereof.

DETAILED DESCRIPTION OF THE INVENTION

There will now be described the fundamental concept of measuring the elevation of a three-dimensional foreground subject from aeronautic stereoscopic photographs.

Figure 1:
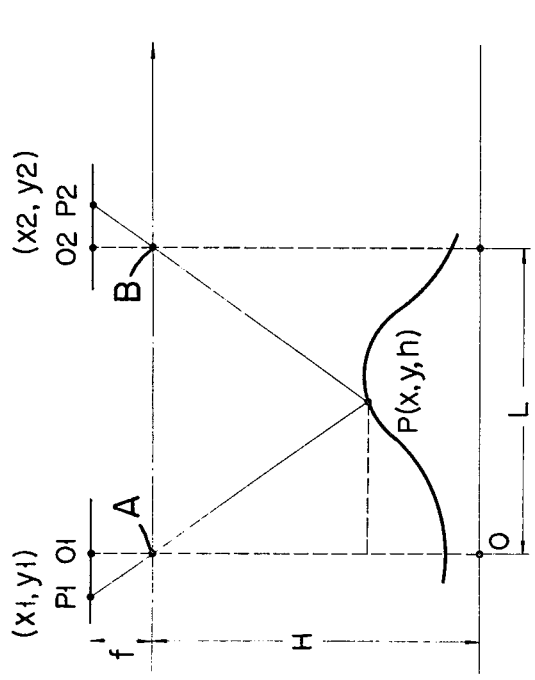
FIG. 1 is a schematical view illustrating a taking manner of a pair of aeronautic stereoscopic photographs.
Figure 2:
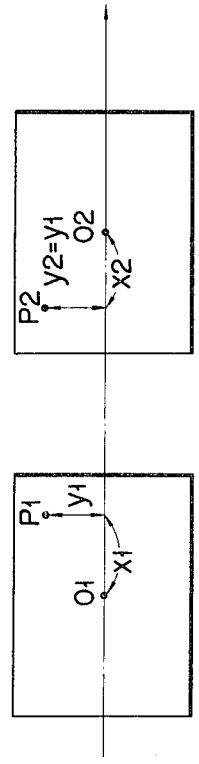
FIG. 2 presents the interrelationship of a pair of aeronautic stereoscopic photographs.

Referring to FIG. 1, the height H of a flight passage indicated by the dot-dash line is previously determined. A three-dimensional foreground subject is photographed at two points A, B on said flight passage. A distance L between these two points A, B is also specified. The aeronautic photography is carried out in such a manner that about 60% of the two photographs overlap each other so as to cause about 60% of the same area to be included in each photograph. Now let it be assumed that the area of, for example, a hill including point P shown in FIG. 1 is photographed Then, the images of point P photographed at points A, B are picked up at points $P_1$, $P_2$ of a dry-plate spaced from points A, B. The camera used has a lens of a focal length $f$. When a positive picture is prepared by developing the dry-plate, then the image of the point P of the aforesaid hill is presented at points $P_1$, $P_2$ in the paired aeronautic stereoscopic photographs. Referring to FIG. 1, point O on the ground is taken as the base, and the direction of a flight is designated as the $x$ axis, the direction of the height of the flight as the $z$ axis, and a direction perpendicular to both directions as the $y$ axis. The aforesaid point P of the hill is expressed as (X, Y, $h$) in this coordinate system. Referring to FIG. 2, the direction of flight shown in the stereoscopic photograph is designated as the $x$ axis, a direction perpendicular thereto as the $y$ axis, and the coordinate positions of points $P_1$, $P_2$ are denoted by $(x_1, y_1)$, $('x_2, 'y_2)$ respectively. Then the following equation will result from the formula of homologous triangles:

$$\frac{x_1}{f} = \frac{X}{H-h} \qquad (1)$$

$$\frac{x_2}{f} = \frac{L-X}{H-h} \qquad (2)$$

Since $y_1 = y_2 = y$, the following equation will result with respect to the $y$ axis:

$$\frac{y}{f} = \frac{Y}{H-h} \qquad (3)$$

Throughout the above equations (1) to (3), $x_1$, $x_2$ and $y$ are all taken to have a positive absolute value. If the coordinate positions of points $P_1$, $P_2$ in the stereoscopic photographs are defined by the equations (1) to (3), then the coordinate position (X, Y, $h$) of the elevation of point P of the hill can be determined. The following equation is derived from the equations (1), (2)

$$h = H - \frac{f}{d} \cdot L \qquad (4)$$

where $d = x_1 + x_2$, which is called the parallax. If, therefore, the mutual displacement $(x_1 + x_2)$ of the corresponding points $P_1$, $P_2$ shown in the stereoscopic photographs is found, then the elevation h of point P can be measured by the equation (4).

The prior art process of measuring the elevation of a three-dimensional foreground subject consists in determining the interrelationship of the minute areas including the corresponding points indicated in the paired stereoscopic photographs and judging the minute areas whose interrelationship gives a maximum value to be the substantially corresponding ones and calculating the mutual displacement of said minute areas as that of the corresponding points.

Figure 3C:
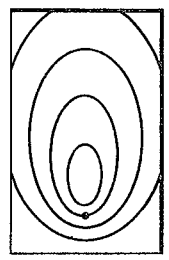
FIGS. 3a to 3c are intended to show the distortions of the images presented in the paired aeronautic stereoscopic photographs.
Figures 3A, 3B:
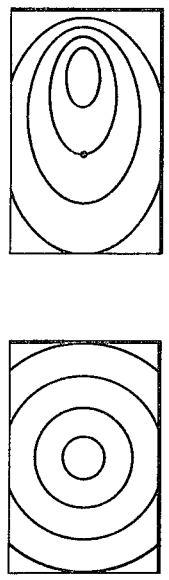

With the above-mentioned prior art process, however, distortion will take place in the stereoscopic photograph, as any selected points in the minute areas of the stereoscopic photographs denote the different elevation of the foreground subject. In photography, data on elevation are all shown in a plane. Therefore, in stereoscopic photographs taken at different points, data on heights present different patterns according to the direction in which said photographs are taken, thus resulting in the distortion of the images obtained. Though the contour map of the hill of FIG. 1 normally shows the pattern of FIG. 3a, the photographs of said hill taken at points A, B of FIG. 1 indicate such contour patterns as are illustrated in FIGS. 3b, 3c respectively. Though, therefore, the corresponding minute areas may be determined from two stereoscopic photographs, the central points of said areas do not always represent the actually corresponding points, if any given points in said areas denote the different elevation of the hill. Accordingly, the prior art process can not accurately determine the displacement of the corresponding points of two stereoscopic photographs, failing to effect the correct measurement of the elevation of the hill.

As described with reference to FIG. 1, the apparatus according to this invention for measuring the elevation of a three-dimensional foreground subject consists in first determining the corresponding minute areas from composite pictures such as stereoscopic photographs and then accurately defining the displacement of said corresponding minute areas using an electric image-processing device capable of carrying out a feedback function, thus correctly measuring the elevation of said foreground subject.

There will now be described the case where the elevation of a three-dimensional foreground subject is measured by aeronautic stereoscopic photographs, using the elevation-measuring apparatus of this invention.

Figure 4A:
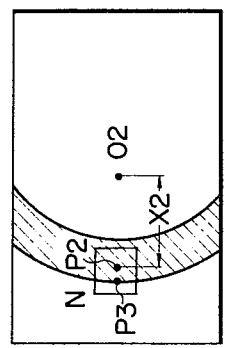
FIGS. 4a to 4d are views illustrating the operation of a elevation-measuring apparatus according to this invention.
Figure 4B:
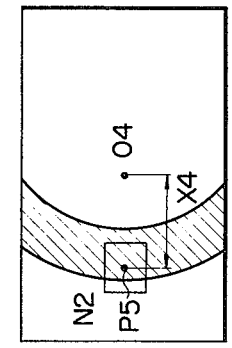

First, two aeronautic stereoscopic photographs of FIGS. 4a, 4b are first provided. For convenience, the picture of FIG. 4a photographed at point A is referred to as the first image and the picture of FIG. 4b photographed at point B is referred to as the second image. The hatched sections of the first and second images are regarded as the corresponding areas. The reason why the corresponding areas present different patterns is that said areas denote the different elevation of the foreground subject.

A minute area M having a prescribed size is selected from the first image, and search is made in the second image for a minute area corresponding to said minute area M. The shades of the sampled ones of numerous dots included in said minute area M are stored in a digital form in a separately provided memory device. Similarly, the shades of the sampled ones of numerous dots included in any minute area of the second image having the same size as the minute area M of the first image are stored in a digital form in another memory device. The distributions of the shades of the sampled dots included in the minute areas of both first and second images are compared by a comparator to define an interrelationship therebetween. Of the minute areas of the second image, that which bears a maximum value of interrelationship with the minute area M of the first image is defined as a minute area N corresponding to said minute area M.

When the corresponding minute areas M, N of the first and second images are determined through the above-mentioned process, then it is indeed possible to define the elevation $h$ of the points $P_1$, $P_2$ with the displacement of said corresponding minute areas M, N namely, the displacement $d = x_1 - x_2$ of the points $P_1$, $P_2$, using the aforesaid equation (4). But the above-mentioned process simply attains agreement between the distributions of the shades of the sampled ones of numerous dots included in the corresponding minute areas M, N. Where, however, said minute areas M, N denote the different elevation of a foreground subject, then distortion will appear, as previously described, in the respective stereoscopic images. Consequently, the central points $P_1$, $P_2$ do not always represent the true corresponding points. As apparent from FIGS. 4a, 4b, the point of the second image of FIG. 4b which truly corresponds to point $P_1$ of the first image of FIG. 4a is not point $P_2$, but point $P_3$ displaced therefrom. As the result, the elevation h determined from the displacement of points $P_1$, $P_2$ does not denote the true elevation of point P. Therefore, the elevation-measuring apparatus of this invention carries out the undermentioned operation to determine the substantially true elevation of points $P_1$, $P_2$.

Figure 4C:
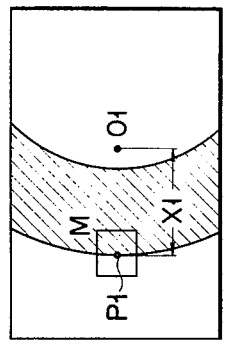

According to this invention, the corresponding minute areas M, N of the first and second images are first determined, and the aforesaid operation of defining the displacement of points similar to said corresponding minute areas M, N is carried out all over the first and second images. Data on the displacements of all the corresponding points of the first and second images are fed back. The pseudo-pattern of the second image is composed from the fed back data and the first image. Said composite image can be easily obtained from a reverse operation from that which is used in determining the displacement of the central points of the corresponding minute areas of the first and second images, using an electronic computer. FIG. 4c shows a pseudoimage thus composed. This pseudoimage is not actually reproduced in the form of a photograph. It is simply stored, as later described, in the memory device of the electronic computer in the form of image data.

Interrelationship is determined between the second image and its pseudoimage by the same process as is used in defining the interrelationship of the first and second images, so as to find the corresponding minute areas N, $N_1$ as shown in FIGS. 4b, 4c. In this case, the pseudoimage which was composed from the displacement of the corresponding two points does not coincide with the second image. Consequently, the central points $P_2$, $P_4$ of the corresponding minute areas N, $N_1$ do not fall on each other, thus indicating the displacement $X_2 - X_3$ of points $P_2$, $P_4$.

Figure 4D:
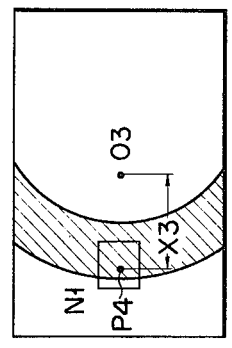

Data on the displacement of point $P_2$ of the second image and point $P_4$ of a first pseudoimage is fed back to compose the second pseudoimage of FIG. 4d. Next, interrelationship is determined between the second image and the second pseudoimage in the same manner as previously described to define a minute area $N_2$ corresponding to the minute area N, thereby finding the displacement $X_2-X_4$ of the central points $P_2$, $P_5$ of said corresponding minute areas N, $N_2$.

Data on the displacement of each pair of the corresponding points of the first and second images is fed back, as described above, to compose a fresh pseudoimage from said displacement and the second image. Further, interrelationship is determined between said fresh pseudoimage and second image. This operation is repeated until the displacements of the respective pairs of corresponding points fall within a prescribed range. After completion of said repeated operations, an algebraic sum is made of all the displacements of the respective pairs of the corresponding points defined by the repeated operations. If the elevation of the respective points is determined from said algebraic sum using the previously described equation (4), then the value obtained will substantially approach true value.

Figure 5:
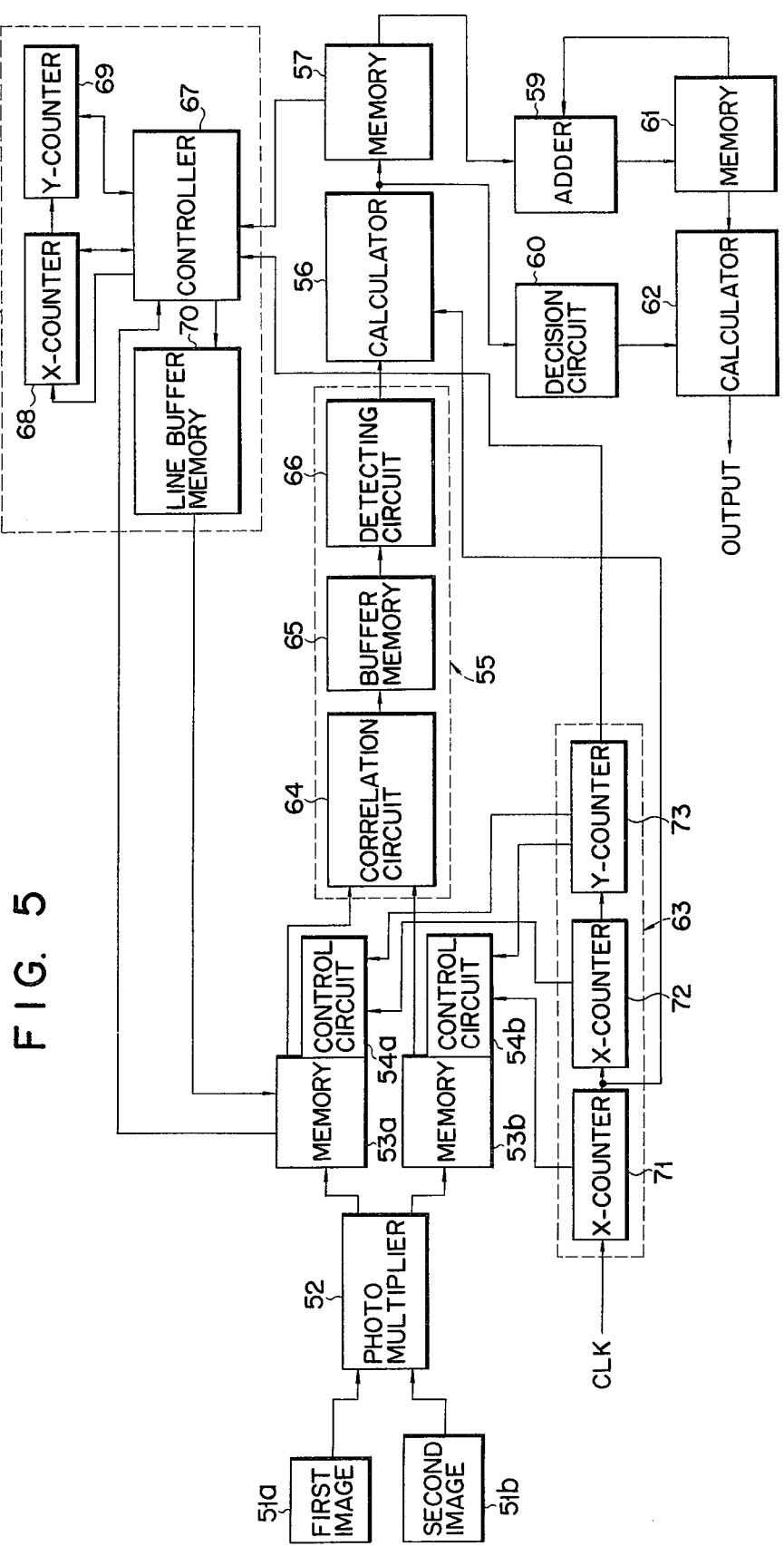
FIG. 5 is a block circuit diagram of the elevation-measuring apparatus according to this invention.

There will now be described by reference to FIG. 5 the circuit of the elevation-measuring apparatus of this invention which is designed to repeat the above-mentioned operation of determining the displacement of each pair of corresponding points of the first and second images.

The first image 51a and second image 51b are scanned by a photoelectric conversion device, for example, a photomultiplier 52 to provide electric signals corresponding to said first and second images 51a, 51b. Data on the shades of the sampled ones of numerous dots included in the corresponding minute areas of the first and second images 51a, 51b are successively scanned to provide time series digital signals. The digital signals associated with the first image 51a are stored in a memory device 53a and those associated with the second image 51b are stored in another memory device 53b. Data stored in both memory devices 53a, 53b are extracted by the corresponding control circuits 54a, 54b for each minute area having a prescribed size and delivered to a correlater 55. This correlater determines interrelationship between a given minute area in the first image 51a and the corresponding minute area of the second image 51b having a prescribed size, and repeats this comparing operation finally to define the minute area of the second image 51b which bears a maximum value of interrelationship with the aforesaid minute area of the first image 51a. In brief, the correlater 55 defines the minute area N of the second image 51b of FIG. 4b which corresponds to the minute area M of the first image 51a of FIG. 4a. The correlater 55 comprises a correlation circuit 64 for calculating the value of interrelationship between data on the minute area of the first image 51a delivered from the memory device 53a and data on the corresponding minute area of the second image 51b drawn out from the memory device 53b and a correlating value buffer memory 65 for temporarily storing the value of interrelationship supplied from said circuit 64. When the values of interrelationship of all pairs of corresponding minute areas of the first image 51a and the second image 51b are calculated, then the computed values are conducted to a maximum value-detecting circuit 66 which finally defines that minute area of the second image 51b indicates a maximum value of interrelationship of the corresponding minute area of the first image 51a. The maximum value-detecting circuit 66 supplies the calculator 56 with a signal denoting data on the location of the minute area of the second image 51b presenting a maximum value of interrelationship with the corresponding minute area of the first image 51a in the form of a coordinate value.

In this case, the signals supplied to the calculator 56 bear integral values. To improve the precision of measurement, however, it is advised to apply, as later described, a coordinate system capable of indicating a maximum value of interrelationship in decimals.

This decimal coordinate system is often used in estimating the relative coordinate values of scattered points from data only obtained at scattered points. This process consists in choosing a given scattered point indicating a maximum value of interrelationship and two points on both sides of said scattered point, calculating a curve of secondary degree and taking a point representing the maximum value of said curve of secondary degree as a corrdinate value showing a maximum interrelationship. In this case, the correlater 55 supplies real numbers to the calculator circuit 56. Said real numbers are also stored in a memory device 57 connected to the rear side of said calculating circuit 56 to be successively stored with maximum values of interrelationship delivered from the calculating circuit 56.

There will now be further detailed the operation of the calculator 56. This circuit 56 calculates the displacement of the central points of those of the corresponding minute areas of the first and second images 51a, 51b which indicate a maximum value of interrelationship, namely, a distance between both central points. The operation of determining the corresponding minute areas of the first and second images and computing the displacement of the corresponding minute areas is carried out with respect to the whole of the first and second images. Values of the displacements of the central points of the respective pairs of the corresponding minute areas are successively stored in the designated addresses of the memory 57.

Data on said displacements recorded in the memory 57 are delivered to an adder 59, an output signal from which is stored in a memory device 61. An output signal from the latter memory 61 is fed back to the adder 59 to be added to an output signal from the former memory 57 and thereafter again stored in the latter memory 61. Namely, the adder 59 has a function of carrying out the addition of data stored in the memory cells of the memories 57, 61 having the same address and recording the results of addition in the corresponding address of the memory 61.

An output signal from the calculator 56 is also supplied to a decision circuit 60. Where on output signal from the calculator 56 indicates a prescribed value, namely, where the values of the displacements of the respective pairs of the corresponding minute areas of the first and second images fall to below a prescribed level, then the decision circuit 60 gives forth a start signal to a calculator 62 for the initiation of its operation. The input side of the latter calculator 62 is connected to the memory 61, causing a signal already stored in the memory 61 to be delivered to the calculator 62 when it is supplied with a start signal. This calculator 62 calculates the elevation of points $P_1$, $P_2$ from a combination of a signal supplied from the memory 61 denoting the displacements of the respective pairs of the corresponding minute areas of the first and second images 51a, 51b, the previously specified height H of a flight passage, a distance L between the two points A, B of photographing and the focal length f of the camera lens, using the aforesaid equation (4), and gives forth the results of said calculation in the form of analogue voltage or a digital signal. It will of course be understood the parameters such as a distance L, focal length $f$ and height H are values which are pre-set into the calculator 62.

The above-mentioned image processing circuitry further comprises a calculating circuit 58 for correcting the pattern of the first image stored in the memory 53a by the extent of displacement. This calculating circuit 58 comprises a controller 67 designed to draw out data from the memory 57 and record data therein, an X-counter 68 and Y-counter 69 for designating the addresses of the memory devices 57, 53a, and a line buffer memory 70 for temporarily storing a signal associated with a minute area constituting one line of an image so as to change data already stored in the memory 53a. The controller 67 is operated by a start signal delivered from the later described control circuit 63, thereby clearing all the X-counter 68, Y-counter 69 and line buffer memory 70. The controller 67 draws out those parts of the content of the memory 53a which are designated by the X-counter 68 and Y-counter 69 and records the data of said parts in that address of the line buffer memory 70 which is designated by the data of the memory 57 specified by the X- and Y-counters 68, 69. Upon completion of said recording, the controller 67 increases the content of the X-counter 68 by one and carries out recording in the same manner as described above. Where the recording operation is successively carried out until the content of the X-counter 68 overflows, then the controller 67 writes the content of the line buffer memory 70 in one line of the memory 53a designated by the data of the Y-counter 69 and also increases the content of the Y-counter 69 by one, thereby correcting that data of the memory 53a which corresponds to said one line of the image. The above-mentioned operation is repeated until the data of the Y-counter 69 overflows.

The control circuit 63 comprises three registers or X-counters 71, 72 and Y-counter 73 for storing the addresses of the corresponding minute areas of the first and second images 51a, 51b. The address of the minute area of the first image 51a has its X-axis value stored in the X-counter 72 and its Y-axis value stored in the Y-counter 73. The address of the minute area of the second image 51b has its X-axis value stored in the X-counter 71 and its Y-axis value stored in the common Y-counter 73 as in the case of the first image 51a. The reason why the common Y-counter 73 is used with respect to Y-axis values is that the corresponding minute areas of the first and second stereoscopic images whose positions have been aligned have the same Y-axis value.

Output signals from the X-counter 72 and the common Y-counter 73 are supplied to the control circuit 54a corresponding to the memory device 53a. Upon receipt of said output signals, the control circuit 54a reads out those parts of the content of the memory device 53a which correspond to the coordinate values indicated by said output signals in the prescribed order, for example, by raster scanning. The data thus read out are conducted to the correlater 55. At this time, output signals from the X-counter 71 and Y-counter 73 are delivered to the control circuit 54b corresponding to the memory 53b. As the result, the control circuit 54b supplies the content of the memory 53b to the correlater 55 as in the case of the first image. Said correlater 55 calculates the value of interrelationship between the corresponding minute areas of the first and second images 51a, 51b from output signals from both control circuits 54a, 54b, causing the content of the Y-counter 73 to be increased by one and consequently the corresponding minute area of the second image to be shifted by one bit in the direction of X. This operation is repeated until the content of the X-counter 71 exceeds the prescribed level. When the content of said X-counter 71 overflows, then said counter 71 generates a signal to start the calculator 56. This calculating circuit 56 calculates the displacement of the corresponding areas of the first and second images 51a, 51b from that of the X axis values of output signals delivered from the correlater 55 which indicates a maximum degree of interrelationship. The calculated maximum value of interrelationship is recorded in the address of the memory 57 which is designated by the X-counter 72 and the Y-counter 73. The overflow signal from the X-counter 71 increases the content of the other X-counter 72 by one, causing the corresponding minute area of the first image to be shifted by one bit in the direction of X. The above-mentioned operation is repeated until the content of the X-counter 72 overflows. The overflow signal from the X-counter 72 increases the content of the Y-counter 73 by one, causing the associated minute area of the first image 51a to be shifted by one bit in the direction of Y. This is also the case with the second image 51b.

The above-mentioned operation is repeated until the content of the Y-counter 73 overflows. At the time of said overflow, calculation is made of the displacements of all the minute areas of the first image 51a. Data on said calculated displacements are written in the memory 57. The overflow signal from the Y-counter 73 is supplied as a start signal to the calculating circuit 58.

The main points of the operation of the above mentioned image-processing circuitry will now be briefly described by reference to FIGS. 4a to 4d. The first image 51a corresponds to FIG. 4a and the second image 51b to FIG. 4b. The corresponding minute areas of the first and second images 51a, 51b whose interrelationship has been determined are designated as M, N. The calculating circuit 58 produces the pseudo-pattern of the second image shown in FIG. 4c. The memory 53a is now stored with said pseudo-pattern in place of the first image 51a. Interrelationship is determined between the pseudopattern and second image. As the result, the calculating circuit 58 provides a second pseudo-image shown in FIG. 4d. The memory 53a is stored with said second pseudo-pattern instead of the first pseudo-pattern. As this operation is repeated, the displacements of the corresponding minute areas of the first and second images 51a, 51b becomes smaller. When said displacements are decreased to a lower level than prescribed, then the calculator 62 is operated to calculate the elevation of a three-dimensional foreground subject from the decreased displacements and other parameters. The process of this invention is carried out on all the points of the foreground subject, providing an accurate contour map.

The foregoing description refers to the case where the elevation-measuring apparatus of this invention was used in determining the elevation of a three-dimensional foreground subject from aeronautic stereoscopic photographs. However, the apparatus of this invention is also applicable in other fields. For example, this apparatus is adapted for the design of underwear and the cutting of clothing by photographing the outline of a human body to provide data on a contour pattern. The apparatus is further applicable in obtaining data on the depth of a three-dimensional foreground subject using two photographic apparatuses, as when it is desired to detect the overall outline of said foreground subject during its assembly.

As used herein, the term "elevation" is not limited to a narrow meaning such as the elevation of a hill on the ground which is determinable from aeronautic photographs, but denotes the elevation of the uppermost plane of a three-dimensional subject measured from the prescribed base level.

In the foregoing embodiment, a pair of stereoscopic images were used. However, it is not always necessary to provide such stereoscopic pictures. It is also possible to carry out photoelectric conversion simultaneously with image pickup and record the resultant electric image data in a memory device.

What we claim is:

1. An apparatus for measuring the elevation of a three-dimensional foreground subject by first and second images photographed at two points of known height and having a distance therebetween, which comprises: photoelectric conversion means for generating electric signals representing said photographed first and second images each divided into a plurality of minute areas; a first memory coupled to said photoelectric conversion means for storing electric signals representing said first image supplied from said conversion means; a second memory coupled to said photoelectric conversion means for storing electric signals representing said second image supplied from said conversion means; a correlator coupled to said first and second memories for determining from output signals supplied from the first and second memories a minute area of said second image which has a shade most similar to that of a certain minute area of said first image; calculating means coupled to said correlator for calculating displacement of said determined minute area of the second image and said certain minute area of the first image; correcting means coupled to said calculating means for correcting a pattern of one image to the extent of said calculated displacement, said memory for said one image, correlator, calculating means and correcting means constituting a feed back circuit which is operated until the value of said displacement comes to have a prescribed level; adding means coupled to said calculating means for algebraicly summing all calculated displacements when operation of said feed back circuit is completed; and measuring means coupled to said adding means for measuring by said algebraic sum, said elevation of said three-dimensional foreground subject, said height of said two points and said distance therebetween.

2. An apparatus according to claim 1, wherein: said photoelectric conversion means comprises a photoelectric conversion device for producing signals corresponding to light and shade in said first and second images.

3. An apparatus according to claim 1, wherein: said first and second memories respectively comprise corresponding control circuits and are loaded with data on all minute areas of said first and second images by said control circuits.

4. An apparatus according to claim 3, wherein: said correlator comprises a correlation circuit for correlating all minute areas of said second image and said certain minute area of said first image and a maximum value-detecting circuit for finding one minute area of said second image having a maximum degree of correlation to said certain minute area of said first image.

* * * * *